(12) United States Patent
Perlade et al.

(10) Patent No.: US 12,473,620 B2
(45) Date of Patent: Nov. 18, 2025

(54) COLD ROLLED AND ANNEALED STEEL SHEET AND METHOD OF MANUFACTURING THE SAME

(71) Applicant: ArcelorMittal, Luxembourg (LU)

(72) Inventors: Astrid Perlade, Le Ban-Saint-Martin (FR); Kangying Zhu, Metz (FR); Frédéric Kegel, Yutz (FR)

(73) Assignee: ArcelorMittal, Luxembourg (LU)

(*) Notice: Subject to any disclaimer, the term of this patent is extended or adjusted under 35 U.S.C. 154(b) by 387 days.

(21) Appl. No.: 18/016,543

(22) PCT Filed: Jul. 12, 2021

(86) PCT No.: PCT/IB2021/056243
§ 371 (c)(1),
(2) Date: Jan. 17, 2023

(87) PCT Pub. No.: WO2022/018567
PCT Pub. Date: Jan. 27, 2022

(65) Prior Publication Data
US 2023/0279528 A1    Sep. 7, 2023

(30) Foreign Application Priority Data

Jul. 24, 2020 (WO) .................. PCT/IB2020/057000

(51) Int. Cl.

| | | |
|---|---|---|
| C22C 38/14 | (2006.01) | |
| C21D 6/00 | (2006.01) | |
| C21D 8/02 | (2006.01) | |
| C21D 9/46 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/12 | (2006.01) | |
| F16B 5/08 | (2006.01) | |
| B32B 7/05 | (2019.01) | |
| B32B 15/01 | (2006.01) | |

(52) U.S. Cl.
CPC ............ *C22C 38/14* (2013.01); *C21D 6/005* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *F16B 5/08* (2013.01); *B32B 7/05* (2019.01); *B32B 15/011* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 4,854,976 A | 8/1989 | Era et al. |
| 10,633,727 B2 | 4/2020 | Garza-Martinez et al. |
| 2012/0128970 A1 | 5/2012 | Motoe et al. |
| 2016/0312323 A1 | 10/2016 | Rana et al. |
| 2019/0338388 A1 | 11/2019 | Pipard et al. |
| 2021/0292862 A1 | 9/2021 | Han et al. |
| 2021/0317554 A1 | 10/2021 | Ryu et al. |
| 2022/0002847 A1 | 1/2022 | Krizan et al. |

FOREIGN PATENT DOCUMENTS

| | | |
|---|---|---|
| CN | 107109588 A | 8/2017 |
| CN | 107858586 A | 3/2018 |
| CN | 110066964 A | 7/2019 |

(Continued)

OTHER PUBLICATIONS

Search Report of PCT/IB2021/056233 dated Oct. 8, 2021 and International Report on Patentability.

(Continued)

*Primary Examiner* — Anthony M Liang
(74) *Attorney, Agent, or Firm* — Davidson Kappel LLC

(57) ABSTRACT

A cold rolled and annealed steel sheet, made of a steel having a composition including, by weight percent: C: 0.03-0.18%, Mn: 6.0-11.0%, Al: 0.2-3%, Mo: 0.05-0.5%, B: 0.0005-0.005%, S≤0.010%, P≤0.020%, N≤0.008%, and including optionally one or more of the following elements, in weight percentage: Si≤1.20%, Ti≤0.050%, Nb≤0.050%, Cr≤0.5%, V≤0.2%, the remainder of the composition being iron and unavoidable impurities resulting from the smelting, the steel sheet having a microstructure including, in surface fraction, from 25% to 55% of retained austenite, from 45% to 75% of ferrite, less than 5% of fresh martensite, a carbon $[C]_A$ and manganese $[Mn]_A$ content in austenite, expressed in weight percent, such that the ratio $([C]_A \times [Mn]^2_A)/(C\% \times Mn\%)$ is from 19.0 to 41.0 wt %, C % and Mn % being the nominal values in carbon and manganese in weight % and a carbides density below $3 \times 10^6/mm^2$ and—an inhomogeneous repartition of manganese characterized by a manganese distribution with a slope above or equal to −30.

9 Claims, 1 Drawing Sheet

(56) References Cited

FOREIGN PATENT DOCUMENTS

| | | | | |
|---|---|---|---|---|
| CN | 110088332 A | 8/2019 | | |
| CN | 111218621 A | 6/2020 | | |
| EP | 3492618 A1 | 6/2019 | | |
| JP | 2011153336 A | 8/2011 | | |
| JP | 2017218672 A | 12/2017 | | |
| JP | 2019014933 A | 1/2019 | | |
| JP | 2019039037 A | 3/2019 | | |
| KR | 20040059293 A | 7/2004 | | |
| KR | 20120026136 A | 3/2012 | | |
| KR | 20150112508 A | 10/2015 | | |
| KR | 20170075853 A | 7/2017 | | |
| KR | 20200024398 A | 3/2020 | | |
| WO | WO2017125773 A1 | 7/2017 | | |
| WO | WO2017125809 A1 | 7/2017 | | |
| WO | WO-2017212885 A1 | * 12/2017 | .............. | C21D 9/46 |
| WO | WO2018054787 A1 | 3/2018 | | |
| WO | WO2019122961 A1 | 6/2019 | | |
| WO | WO 2019123245 A1 | 6/2019 | | |
| WO | WO 2019134102 A1 | 7/2019 | | |
| WO | WO 2019155014 A1 | 8/2019 | | |
| WO | WO2020011638 | 1/2020 | | |
| WO | WO2020050573 A1 | 3/2020 | | |
| WO | WO 2022/018562 A1 | 1/2022 | | |
| WO | WO 2022/018563 A1 | 1/2022 | | |
| WO | WO 2022/018565 A1 | 1/2022 | | |
| WO | WO 2022/018566 A1 | 1/2022 | | |
| WO | WO 2022/018567 A1 | 1/2022 | | |
| WO | WO 2022/018568 A1 | 1/2022 | | |
| WO | WO 2022/018569 A1 | 1/2022 | | |
| WO | WO 2022/018571 A1 | 1/2022 | | |

OTHER PUBLICATIONS

Search Report of PCT/IB2021/056243 dated Oct. 8, 2021 and International Report on Patentability.
Search Report of PCT/IB2021/056235 dated Sep. 8, 2021 and International Report on Patentability.
Search Report of PCT/IB2021/056241 dated Oct. 4, 2021 and International Report on Patentability.
Search Report of PCT/IB2021/056237 dated Aug. 4, 2021 and International Report on Patentability.
Search Report of PCT/IB2021/056245 dated Aug. 4, 2021 and International Report on Patentability.
Search Report of PCT/IB2021/056244 dated Aug. 24, 2021 and International Report on Patentability.
Search Report of PCT/IB2021/056247 dated Oct. 4, 2021 and International Report on Patentability.
Lee et al.: "Observation of the TWIP + TRIP Plasticity-Enhancement Mechanism in Al-Added 6 Wt Pct Medium Mn Steel," Metallurgical and Materials Transactions A, vol. 46A, Jun. 2015, 2356-2363.

* cited by examiner

Trial 17　　　　　　　　　　Trial 1

COLD ROLLED AND ANNEALED STEEL SHEET AND METHOD OF MANUFACTURING THE SAME

The present invention relates to a high strength steel sheet having good weldability properties and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

SUMMARY OF THE INVENTION

One of the major challenges in the automotive industry is to decrease the weight of vehicles in order to improve their fuel efficiency in view of the global environmental conservation, without neglecting the safety requirements. To meet these requirements, new high strength steels are continuously developed by the steelmaking industry, to have sheets with improved yield and tensile strengths, and good ductility and formability.

One of the developments made to improve mechanical properties is to increase content of manganese in steels. The presence of manganese helps to increase ductility of steels thanks to the stabilization of austenite. But these steels present weaknesses of brittleness. To overcome this problem, elements as boron are added. These boron-added chemistries are very tough at the hot-rolled stage but the hot band is too hard to be further processed. The most efficient way to soften the hot band is batch annealing, but it leads to a loss of toughness.

In addition to these mechanical requirements, such steel sheets have to show a good resistance to liquid metal embrittlement (LME). Zinc or Zinc-alloy coated steel sheets are very effective for corrosion resistance and are thus widely used in the automotive industry. However, it has been experienced that arc or resistance welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It is known that adding elements like carbon or silicon are detrimental for LME resistance.

The automotive industry usually assesses such resistance by limiting the upper value of a so-called LME index calculated according to the following equation:

$$\text{LME index} = \%\,C + \%\,Si/4,$$

wherein % C and % Si stands respectively for the weight percentages of carbon and silicon in the steel.

The publication WO2020011638 relates to a method for providing a medium and intermediate manganese (Mn between 3.5 to 12%) cold-rolled steel with a reduced carbon content. Two process routes are described. The first one concerns an intercritical annealing of the cold rolled steel sheet. The second one concerns a double annealing of the cold rolled steel sheet, the first one being fully austenitic, the second one being intercritical. Thanks to the choice of the annealing temperature, a good compromise of tensile strength and elongation is obtained. By lowering annealing temperature an enrichment in austenite is obtained, which implies a good fracture thickness strain value. But the low amount of carbon and manganese used in the invention limits the tensile strength of the steel sheet to values not higher than 980 MPa.

An object of the present invention is to provide a cold rolled and annealed steel sheet having a combination of high mechanical properties with the tensile strength is above or equal to 950 MPa, the uniform elongation UE is above or equal to 12.0%, the total elongation TE is above or equal to 15% and wherein YS, UE, TS and TE satisfy the following equation (YS×UE+TS×TE)/(C %×Mn %)>34 000, TE being the total elongation of the sheet expressed in %, the tensile strength TS being expressed in MPa, the yield strength YS being expressed in MPa, the uniform elongation UE being expressed in %, C % and Mn % being the nominal wt % of C and Mn the steel.

Preferably, the cold rolled and annealed steel sheet has a yield strength above or equal to 780 MPa.

Preferably, the cold rolled annealed steel sheet according to the invention has a LME index of less than 0.36.

Preferably, the cold rolled and annealed steel sheet according to the invention has a carbon equivalent Ceq lower than 0.4, the carbon equivalent being defined as $$Ceq = C\% + Si\%/55 + Cr\%/20 + Mn\%/19 - Al\%/18 + 2.2P\% - 3.24B\% - 0.133*Mn\%*Mo\%$$

with elements being expressed by weight percent.

Preferably, the resistance spot weld of two steel parts of the cold rolled and annealed steel sheet according to the invention has an α value of at least 30 daN/mm2.

The present invention provides a cold rolled and annealed steel sheet, made of a steel having a composition comprising, by weight percent:
  C: 0.03-0.18%
  Mn: 6.0-11.0%
  Al: 0.2-3%
  Mo: 0.05-0.5%
  B: 0.0005-0.005%
  S≤0.010%
  P≤0.020%
  N≤0.008%
  and comprising optionally one or more of the following elements, in weight percentage:
  Si≤1.20%
  Ti≤0.050%
  Nb≤0.050%
  Cr≤0.5%
  V≤0.2%
  the remainder of the composition being iron and unavoidable impurities resulting from the smelting, said steel sheet having a microstructure comprising, in surface fraction,
    from 25% to 55% of retained austenite,
    from 45% to 75% of ferrite,
    less than 5% of fresh martensite,
    a carbon $[C]_A$ and manganese $[Mn]_A$ content in austenite, expressed in weight percent, such that the ratio $([C]_A \times [Mn]^2_A)/(C\,\% \times Mn\,\%)$ is from 19.0 to 41.0 wt %, C % and Mn % being the nominal values in carbon and manganese in weight % and
    a carbides density below $3 \times 10^6/mm^2$ and
    an inhomogeneous repartition of manganese characterized by a manganese distribution with a slope above or equal to −30.

DETAILED DESCRIPTION

Figure 1:
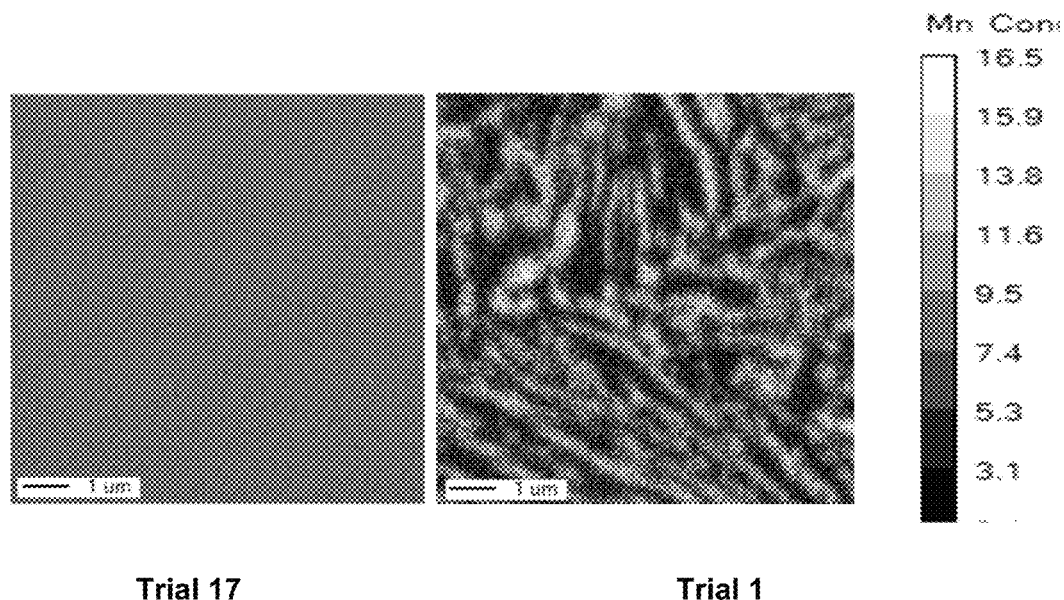
FIG. 1 represents a section of the hot rolled and heat-treated steel sheet of trial 17 and trial 1.

The invention will now be described in detail and illustrated by examples without introducing limitations.

According to the invention the carbon content is from 0.03% to 0.18% to ensure a satisfactory strength and good weldability properties. Above 0.18% of carbon, weldability of the steel sheet and the resistance to LME may be reduced. The temperature of the soaking depends on carbon content: the higher the carbon content, the lower the soaking temperature to stabilize austenite. If the carbon content is lower than 0.03%, the austenite fraction is not stabilized enough to obtain, after soaking, the desired tensile strength and elongation. In a preferred embodiment of the invention, the carbon content is from 0.05% to 0.15%. In another preferred embodiment of the invention, the carbon content is from 0.05% to 0.12%.

The manganese content is from 6.0% to 11.0%. Above 11.0% of addition, weldability of the steel sheet may be reduced, and the productivity of parts assembly can be reduced. Moreover, the risk of central segregation increases to the detriment of the mechanical properties. As the temperature of soaking depends on manganese content too, the minimum of manganese is defined to stabilize austenite, to obtain, after soaking, the targeted microstructure and strengths. Preferably, the manganese content is from 6.0% to 9%.

According to the invention, aluminium content is from 0.2% to 3% to decrease the manganese segregation during casting. Aluminium is a very effective element for deoxidizing the steel in the liquid phase during elaboration. Above 3% of addition, the weldability of the steel sheet may be reduced, so as castability. Moreover, tensile strength above 980 MPa is difficult to achieve. Moreover, the higher the aluminium content, the higher the soaking temperature to stabilize austenite. Aluminium is added at least 0.2% to improve product robustness by enlarging the intercritical range, and to improve weldability. Moreover, aluminium is added to avoid the occurrence of inclusions and oxidation problems. In a preferred embodiment of the invention, the aluminium content is from 0.7% to 2.2%.

The molybdenum content is from 0.05% to 0.5% to decrease the manganese segregation during casting. Moreover, an addition of at least 0.05% of molybdenum provides resistance to brittleness. Above 0.5%, the addition of molybdenum is costly and ineffective in view of the properties which are required. In a preferred embodiment of the invention, the molybdenum content is from 0.1% to 0.3%.

According to the invention, the boron content is from 0.0005% to 0.005% to improve the toughness of the hot rolled steel sheet and the spot weldability of the cold rolled steel sheet. Above 0.005%, the formation of boro-carbides at the prior austenite grain boundaries is promoted, making the steel more brittle. In a preferred embodiment of the invention, the boron content is from 0.001% to 0.003%.

Optionally some elements can be added to the composition of the steel according to the invention.

The maximum addition of silicon content is limited to 1.20% to improve LME resistance. In addition, this low silicon content makes it possible to simplify the process by eliminating the step of pickling the hot rolled steel sheet before the hot band annealing. Preferably the maximum silicon content added is 0.5%.

Titanium can be added up to 0.050% to provide precipitation strengthening. Preferably, a minimum of 0.010% of titanium is added in addition of boron to protect boron against the formation of BN.

Niobium can optionally be added up to 0.050% to refine the austenite grains during hot-rolling and to provide precipitation strengthening. Preferably, the minimum amount of niobium added is 0.010%.

Chromium and vanadium can optionally be respectively added up to 0.5% and 0.2% to provide improved strength.

The remainder of the composition of the steel is iron and impurities resulting from the smelting. In this respect, P, S and N at least are considered as residual elements which are unavoidable impurities. Their content is less than or equal to 0.010% for S, less than or equal to 0.020% for P and less than or equal to 0.008% for N.

The microstructure of the cold rolled and annealed steel sheet according to the invention will now be described. It contains, in surface fraction:
  from 25% to 55% of retained austenite,
  a carbon $[C]_A$ and manganese $[Mn]_A$ content in austenite, expressed in weight percent, such that the ratio $([C]_A \times [Mn]^2_A)/(C\%\times Mn\%)$ is from 19.0 to 41.0 wt %, C % and Mn % being the nominal values in carbon and manganese in weight % and
  from 45% to 75% of ferrite,
  less than 5% of fresh martensite,
  a carbides density below $3\times 10^6/mm^2$ and
  an inhomogeneous repartition of manganese characterized by a manganese distribution with a slope above or equal to −30.

The microstructure of the steel sheet according to the invention contains from 25% to 55% of retained austenite and preferably from 30 to 50% of austenite. Below 25% or above 55% of austenite, the uniform and total elongations UE and TE can not reach the respective minimum values of 12% and 15%.

Such austenite is formed during the intercritical annealing of the hot-rolled steel sheet but also during the first and second intercritical annealing of the cold rolled steel sheet. During the intercritical annealing of the hot rolled steel sheet, areas containing a manganese content higher than nominal value and areas containing a manganese content lower than nominal value are formed, creating a heterogeneous distribution of manganese. Carbon co-segregates with manganese accordingly. This manganese heterogeneity is measured thanks to the slope of manganese distribution for the hot rolled steel sheet, which must be above or equal to −30, as shown on FIG. 2 and explained later.

Thanks to the inhomogeneous repartition of manganese in austenite after the hot band annealing and the low diffusion kinetics of manganese in austenite, the manganese heterogeneity formed during hot band annealing is still present after the first and second intercritical annealing of the cold rolled steel sheet. This can be evidenced by the slope of manganese distribution in the microstructure which is above or equal to −30.

The carbon $[C]_A$ and manganese $[Mn]_A$ contents in austenite, expressed in weight percent, are such that the ratio $([C]_A \times [Mn]^2_A)/(C\%\times Mn\%)$ is from 19.0 to 41.0 wt %. When the ratio is below 19.0, the retained austenite is not stable enough, leading to a decrease of both yield strength and elongation due to the rapid transformation of retained austenite into martensite. When it is above 41.0, the retained austenite is too stable to generate a sufficient TRIP-TWIP effect during deformation. Such TWIP-TRIP effect is notably explained in "Observation-of-the-TWIP-TRIP-Plasticity-Enhancement-Mechanism-in-Al-Added-6-Wt-Pct-Medium-Mn-Steel", DOI: 10.1007/s11661-015-2854-z, The Minerals, Metals & Materials Society and ASM International 2015, p. 2356 Volume 46A, June 2015 (S. LEE, K. LEE, and B. C. DE COOMAN).

The microstructure of the steel sheet according to the invention contains from 45% to 75% of ferrite, preferably from 45 to 70% of ferrite. Such ferrite is formed during the intercritical annealing of the hot-rolled steel sheet but also during the first and second intercritical annealing of the cold rolled steel sheet.

Fresh martensite can be present up to 5% in surface fraction but is not a phase that is desired in the microstructure of the steel sheet according to the invention. It can be formed during the final cooling step to room temperature by transformation of unstable austenite. Indeed, this unstable austenite with low carbon and manganese contents leads to a martensite start temperature Ms above 20° C. To obtain the final mechanical properties, the fresh martensite is limited to a maximum of 5%, preferably to a maximum of 3% or even better reduced down to 0.

Finally, the carbides density should remain below $3 \times 10^6/mm^2$ to ensure that the global properties combination index [YS×UE+TS×TE]/(C %×Mn %) remains above 34 000. Such carbides can form during the first annealing after a cold-rolling when T1 temperature is too low.

The cold rolled and annealed steel sheet according to the invention has a tensile strength TS above or equal to 950 MPa, a uniform elongation UE above or equal to 12.0% and a total elongation TE above or equal to 15%.

Preferably, the cold rolled and annealed steel sheet has a yield strength above or equal to 780 MPa.

Preferably, the cold rolled and annealed steel sheet has a LME index below 0.36.

Preferably, the cold rolled and annealed steel sheet has a carbon equivalent Ceq lower than 0.4% in order to improve weldability. The carbon equivalent is defined as Ceq=C %+Si %/55+Cr %/20+Mn %/19−Al %/18+2.2P %−3.24B %−0.133*Mn %*Mo %, with elements being expressed by weight percent.

A welded assembly can be manufactured by producing two parts out of sheets of cold rolled and annealed steel according to the invention, and then perform resistance spot welding of the two steel parts.

The resistance spot welds joining the first sheet to the second sheet are characterized by a high resistance in cross-tensile test defined by an α value of at least 30 daN/mm2.

The steel sheet according to the invention can be produced by any appropriate manufacturing method and the person skilled in the art can define one. It is however preferred to use the method according to the invention comprising the following steps:

A semi-product able to be further hot-rolled, is provided with the steel composition described above. The semi product is heated to a temperature from 1150° C. to 1300° C., so to make it possible to ease hot rolling, with a final hot rolling temperature FRT from 800° C. to 1000° C. Preferably, the FRT is from 850° C. to 950° C.

The hot-rolled steel is then cooled and coiled at a temperature $T_{coil}$ is from 20° C. to 650° C., and preferably from 300 to 500° C.

The hot rolled steel sheet is then cooled to room temperature and can be pickled.

The hot rolled steel sheet is then annealed to an annealing temperature $T_{HBA}$ from Tc1 to 680° C. Tc1 is the temperature at which all carbides get dissolved for a hot rolled sheet having homogeneous nominal carbon and manganese distribution. Tc1 is higher than Act as Tc1 is the boundary line between the ferrite/austenite/carbides three-phase region and the ferrite/austenite biphase region, which is higher than Ac1 temperature, since Ac1 is the boundary line between the ferrite/carbide region and the ferrite/austenite/carbides region. Preferably the temperature $T_{HBA}$ is from 580° C. to 680° C.

The steel sheet is maintained at said temperature $T_{HBA}$ for a holding time $t_{HBA}$ from 0.1 to 120 h to promote manganese diffusion. Moreover, this heat treatment of the hot rolled steel sheet allows decreasing the hardness while maintaining the toughness above 0.4 J/mm$^2$ of the hot-rolled steel sheet.

The hot rolled and heat-treated steel sheet is then cooled to room temperature and can be pickled to remove oxidation.

The hot rolled and heat-treated steel sheet is then cold rolled at a reduction rate from 20% to 80%.

The cold rolled steel sheet is then submitted to a first annealing at an intercritical temperature T1 from Tc2 to $T_{HBA}$ for a holding time t1 of 1 to 120 h. Tc2 is the temperature at which all carbides get dissolved for a cold rolled sheet having heterogeneous carbon and manganese distribution. Tc2 is usually lower than Tc1 due to the presence of C and Mn enriched zone. If T1 is below Tc2, a high density of carbides which cannot be fully dissolved during the second annealing will remain. The carbon and manganese trapped in carbides cannot contribute to the formation and stabilization of retained austenite. Moreover, the first annealing should be lower than $T_{HBA}$ to concentrate more carbon and manganese in austenite. Therefore, the presence of high carbides density leads to the decrease of the global properties combination index [YS×UE+TS×TE]/(C %×Mn %) below 34 000.

Preferably, the intercritical temperature T1 is from 500 to 650° C. and more preferably from 540° C. to 630° C. and the time $t1_{soak}$ is from 1 to 30 h. Such first annealing can be performed by batch annealing.

The cold rolled steel sheet is then submitted to a second annealing at an intercritical temperature T2 from 650 to 750° C. for a holding time t2 of 105 to 1000 s.

The second annealing is performed at higher temperature than the first annealing to increase the retained austenite fraction and to dilute carbon and manganese in the retained austenite, to have an appropriate mechanical stability of austenite ensuring a sustained TRIP-TWIP effect during deformation.

Preferably, the intercritical temperature T2 is from 670° C. to 720° C. and t2 is from 80 to 500 s. Such second annealing can be performed by continuous annealing.

The cold-rolled and annealed steel sheet is then cooled below 80° C. and preferably to room temperature. Upon cooling, a fraction of austenite which is less rich in manganese and carbon may transform into fresh martensite.

The sheet can then be coated by any suitable process including hot-dip coating, electrodeposition or vacuum coating of zinc or zinc-based alloys or of aluminium or aluminium-based alloys.

The invention will be now illustrated by the following examples, which are by no way limitative.

EXAMPLES

Three grades, whose compositions are gathered in table 1, were cast in semi-products and processed into steel sheets.

TABLE 1

Compositions

| Steel | C | Mn | Al | Mo | B | S | P | N | Si | Nb | Ti | Ceq | Ac1 (° C.) | Ac3 (° C.) |
|---|---|---|---|---|---|---|---|---|---|---|---|---|---|---|
| A | 0.090 | 9.53 | 1.69 | 0.32 | 0.002 | 0.002 | 0.010 | 0.003 | 0 | 0.031 | 0.015 | 0.17 | 550 | 845 |
| B | 0.152 | 7.72 | 0.94 | 0.22 | 0.003 | 0.002 | 0.012 | 0.003 | 0.02 | 0 | 0.018 | 0.33 | 560 | 820 |
| C | 0.050 | 8.00 | 1.03 | 0.31 | 0.003 | 0.001 | 0.004 | 0.002 | 0.04 | 0.035 | 0.015 | 0.12 | 560 | 835 |

The tested compositions are gathered in the following table wherein the element contents are expressed in weight percent.

Ac1 and Ac3 temperatures have been determined through dilatometry tests on the cold-rolled sheet and metallography analysis.

TABLE 2

Process parameters of the hot rolled and heat-treated steel sheets

| Trials | Steel | Hot rolling FRT (° C.) | Coiling CT (° C.) | Hot band annealing (HBA) $T_{HBA}$(° C.) | $t_{HBA}$(h) |
|---|---|---|---|---|---|
| 1 | A | 900 | 450 | 640 | 10 |
| 2 | A | 900 | 450 | 640 | 10 |
| 3 | A | 900 | 450 | 640 | 10 |
| 4 | A | 900 | 450 | 640 | 10 |
| 5 | A | 900 | 450 | 640 | 10 |
| 6 | A | 900 | 450 | 640 | 10 |
| 7 | A | 900 | 450 | 640 | 10 |
| 8 | A | 900 | 450 | 640 | 10 |
| 9 | A | 900 | 450 | 640 | 10 |
| 10 | B | 800 | 450 | 640 | 10 |
| 11 | B | 800 | 450 | 640 | 10 |
| 12 | B | 800 | 450 | 640 | 10 |
| 13 | B | 800 | 450 | 640 | 10 |
| 14 | B | 800 | 450 | 640 | 10 |
| 15 | B | 800 | 450 | 640 | 10 |
| 16 | B | 850 | 450 | 640 | 10 |
| 17 | C | 900 | 450 | — | — |
| 18 | C | 900 | 450 | — | — |
| 19 | C | 900 | 450 | — | — |

Steel semi-products, as cast, were reheated at 1200° C., hot rolled and then coiled at 450° C. The hot rolled and coiled steel sheets are then heat treated at a temperature $T_{HBA}$ and maintained at said temperature for a holding time $t_{HBA}$. The following specific conditions to obtain the hot rolled and heat-treated steel sheets were applied:

The hot rolled and heat-treated steel sheets were analyzed, and the corresponding properties are gathered in table 3.

TABLE 3

Microstructure of the hot rolled and heat-treated steel sheet

| Trials | Slope of the Mn distribution |
|---|---|
| 1 | −13 |
| 2 | −13 |
| 3 | −13 |
| 4 | −13 |
| 5 | −13 |
| 6 | −13 |
| 7 | −13 |
| 8 | −13 |
| 9 | −13 |
| 10 | −25 |
| 11 | −25 |
| 12 | −25 |
| 13 | −25 |
| 14 | −25 |
| 15 | −25 |
| 16 | −25 |
| 17 | −68.5 |
| 18 | −68.5 |
| 19 | −68.5 |

Underlined values: do not match the targeted values.

The slope of the manganese distribution was determined.

The heat treatment of the hot rolled steel sheet allows manganese to diffuse in austenite: the repartition of manganese is heterogeneous with areas with low manganese content and areas with high manganese content. This manganese heterogeneity helps to achieve mechanical properties and can be measured thanks to manganese profile.

FIG. 1 represents a section of the hot rolled and heat-treated steel sheet of trial 17 and trial 1. The black area corresponds to area with lower amount of manganese, the grey area corresponds to a higher amount of manganese.

This figure is obtained through the following method: a specimen is cut at ¼ thickness from the hot rolled and heat-treated steel sheet and polished.

The section is afterwards characterized through electron probe micro-analyzer, with a Field Emission Gun ("FEG") at a magnification greater than 10000× to determine the manganese amounts. Three maps of 10 μm*10 μm of different parts of the section were acquired. These maps are composed of pixels of 0.01 μm². Manganese amount in weight percent is calculated in each pixel and is then plotted on a curve representing the accumulated area fraction of the three maps as a function of the manganese amount.

Figure 2:
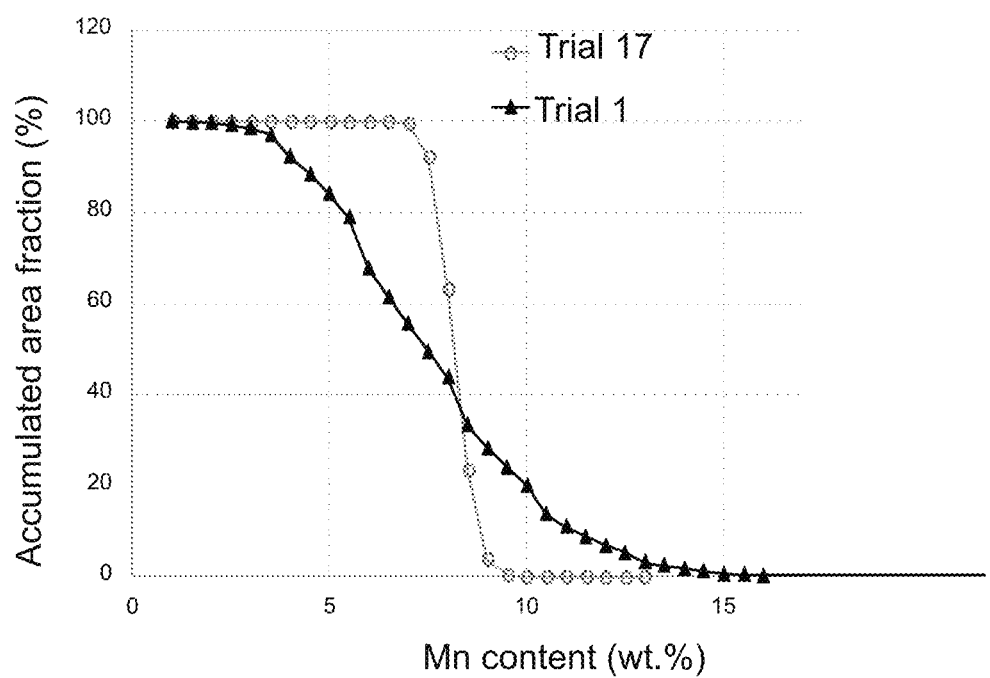
FIG. 2 shows the plotted curve for trial 17 and trial 1 of accumulated area fraction with respect to Mn content.

This curve is plotted in FIG. 2 for trial 17 and trial 1: 100% of the sheet section contains more than 1% of manganese. For trial 1, 20% of the sheet section contains more than 10% of manganese.

The slope of the curve obtained is then calculated between the point representing 80% of accumulated area fraction and the point representing 20% of accumulated area fraction.

For trial 1, this slope is higher than −30, showing that the repartition of manganese is heterogeneous, with areas with low manganese content and areas with high manganese content.

On the contrary, for trial 17, the absence of heat treatment after hot rolling implies that the repartition of manganese is not heterogeneous, which can be seen by the value of the slope of the manganese distribution lower than −30.

TABLE 4

Process parameters of the cold rolled and annealed steel sheets

| | | First annealing | | Second annealing | |
|---|---|---|---|---|---|
| Trials | Cold rolling (%) | T1 (° C.) | t1 (h) | T2 (° C.) | t2 (s) |
| 1 | 50 | 620 | 6 | 700 | 150 |
| 2 | 50 | 560 | 6 | – | – |
| 3 | 50 | 560 | 6 | 700 | 150 |
| 4 | 50 | 540 | 6 | – | – |
| 5 | 50 | 540 | 6 | 700 | 150 |
| 6 | 50 | 540 | 6 | 700 | 300 |
| 7 | 50 | 540 | 6 | 710 | 150 |
| 8 | 50 | 540 | 6 | 720 | 150 |
| 9 | 50 | 540 | 6 | 730 | 150 |
| 10 | 50 | 630 | 6 | 670 | 120 |
| 11 | 50 | 630 | 6 | 690 | 120 |
| 12 | 50 | 630 | 6 | 710 | 120 |
| 13 | 50 | 600 | 6 | 670 | 120 |
| 14 | 50 | 600 | 6 | 690 | 120 |
| 15 | 50 | 600 | 6 | 710 | 120 |
| 16 | 50 | – | – | 710 | 120 |
| 17 | 50 | 725 | 0.17 | 550 | 900 |
| 18 | 50 | 725 | 0.17 | 520 | 900 |
| 19 | 50 | 750 | 0.10 | 550 | 900 |

Underlined values: parameters which do not allow to obtain the targeted properties The hot rolled and heat-treated steel sheet obtained are then cold rolled. The cold rolled steel sheet are then first annealed at a temperature T1 and maintained at said temperature for a holding time t1, before being cooled below 80° C. The steel sheet is then annealed a second time at a temperature T2 and maintained at said temperature for a holding time t2, before being cooled to room temperature. The following specific conditions to obtain the cold rolled and annealed steel sheets were applied:

The cold rolled and annealed sheets were then analyzed, and the corresponding microstructure elements, mechanical properties and weldability properties were respectively gathered in table 5, 6 and 7.

TABLE 5

Microstructure of the cold rolled and annealed steel sheet

| Trials | Retained austenite (%) | Ferrite (%) | Fresh martensite (%) | $[C]_A$ (% wt) | $[Mn]_A$ (% wt) | $[C]_A \times [Mn]^2_A$ / (C % × Mn %) (%) | Carbides density <3 × $10^6$/mm² | Slope of the Mn distribution after 1st annealing | Slope of the Mn distribution after 2nd annealing |
|---|---|---|---|---|---|---|---|---|---|
| 1 | 49 | 48 | 3 | 0.16 | 10.9 | 22.2 | yes | −11 | −11.3 |
| 2 | 30 | 70 | 0 | 0.25 | 12.1 | 42.7 | yes | −12.5 | −12.5 |
| 3 | 38 | 62 | 0 | 0.20 | 11.3 | 29.8 | yes | −12.5 | −12.8 |
| 4 | 25 | 75 | 0 | 0.29 | 12.3 | 51.2 | yes | −12.8 | −12.8 |
| 5 | 34 | 66 | 0 | 0.22 | 11.5 | 33.9 | yes | −12.8 | −13.1 |
| 6 | 37 | 63 | 0 | 0.20 | 11.3 | 29.8 | yes | −12.8 | −13.0 |
| 7 | 40 | 60 | 0 | 0.19 | 11.1 | 27.3 | yes | −12.8 | −13.3 |
| 8 | 48 | 50 | 2 | 0.16 | 10.8 | 21.8 | yes | −12.8 | −13.7 |
| 9 | 48 | 43 | 9 | 0.14 | 10.6 | 18.3 | yes | −12.8 | −14.1 |
| 10 | 38 | 62 | 0 | 0.31 | 9.6 | 24.3 | yes | −23.5 | −23.5 |
| 11 | 42 | 58 | 0 | 0.30 | 9.5 | 23.1 | yes | −23.5 | −23.7 |
| 12 | 46 | 54 | 0 | 0.28 | 9.5 | 21.5 | yes | −23.5 | −24.1 |
| 13 | 36 | 64 | 0 | 0.30 | 9.7 | 24.1 | no | −22.5 | 22.5 |
| 14 | 44 | 56 | 0 | 0.25 | 9.3 | 18.4 | no | −22.5 | −22.7 |
| 15 | 44 | 50 | 6 | 0.23 | 9.2 | 16.6 | no | −22.5 | −23.2 |
| 16 | 55 | 40 | 5 | 0.22 | 9.2 | 15.9 | yes | nd | nd |
| 17 | 19 | 35 | 0 | 0.15 | 8.6 | 27.4 | yes | −52 | −50 |
| 18 | 16 | 35 | 0 | 0.17 | 8.7 | 32.2 | yes | −52 | −51 |
| 19 | 18 | 20 | 0 | 0.15 | 8.8 | 29.0 | yes | −60 | −55 |

Underlined values: not corresponding to the invention,
nd: not determined

The phase percentages of the microstructures of the obtained cold rolled and annealed steel sheet after the second annealing were determined.

$[C]_A$ and $[Mn]_A$ corresponds to the amount of carbon and manganese in austenite, in weight percent. They are measured with X-rays diffraction for carbon and with an electron probe micro-analyzer, with a Field Emission Gun for manganese.

The surface fractions of phases in the microstructure are determined through the following method: a specimen is cut from the cold rolled and annealed steel sheet, polished and etched with a reagent known per se, to reveal the microstructure. The section is afterwards examined through scanning electron microscope, for example with a Scanning Electron Microscope with a Field Emission Gun ("FEG-SEM") at a magnification greater than 5000×, in secondary electron mode.

The determination of the surface fraction of ferrite is performed thanks to SEM observations after Nital or Picral/Nital reagent etching.

The determination of the volume fraction of retained austenite is performed thanks to X-ray diffraction.

The density of carbides is determined thanks to a section of sheet examined through Scanning Electron Microscope with a Field Emission Gun ("FEG-SEM") and image analysis at a magnification greater than 15000×.

In addition to residual austenite and ferrite, trials 17 to 19 include partitioned martensite in respective amounts of 46, 49 and 62%.

The heterogeneity of the manganese distribution obtained after the annealing of the hot rolled steel sheet is maintained as much as possible after both annealing steps of the cold rolled steel sheets. It can be seen by comparing slopes of the manganese distribution obtained after annealing of the hot rolled steel sheet (in Table 3) and the slope of the manganese distribution obtained after first and second annealing steps of the cold rolled steel sheet (Table 5).

TABLE 6

Mechanical properties of the cold rolled and annealed steel sheet

| Trials | TS (MPa) | UE (%) | TE (%) | (YS × UE + TS × TE)/(C % × Mn %) | YS (MPa) |
|---|---|---|---|---|---|
| 1 | 1014 | 13.7 | 18.6 | 36589 | 914 |
| 2 | 1216 | 5.2 | 5.2 | 14716 | 1216 |
| 3 | 1093 | 12.1 | 15.9 | 34567 | 1014 |
| 4 | 1207 | 2.5 | 2.5 | 7093 | 1207 |
| 5 | 1104 | 12.9 | 16.7 | 36731 | 1013 |
| 6 | 1108 | 13.2 | 16.5 | 36628 | 995 |
| 7 | 1138 | 14.4 | 16.7 | 38376 | 966 |
| 8 | 1195 | 13.1 | 16.4 | 35725 | 843 |
| 9 | 1231 | 11.6 | 13.9 | 28768 | 652 |
| 10 | 959 | 25.0 | 27.1 | 41088 | 889 |
| 11 | 1010 | 27.2 | 29.4 | 45309 | 863 |
| 12 | 1092 | 24.8 | 28.3 | 42969 | 787 |
| 13 | 995 | 9.7 | 16.6 | 22086 | 969 |
| 14 | 1013 | 17.3 | 21.4 | 32288 | 937 |
| 15 | 1117 | 16.9 | 20.2 | 30592 | 789 |
| 16 | 1337 | 16.4 | 16.8 | 29107 | 713 |
| 17 | 1155 | 8.7 | 11.1 | 55792 | 1105 |
| 18 | 1157 | 9.9 | 12.1 | 62207 | 1106 |
| 19 | 1133 | 1.3 | 5.9 | 20210 | 1122 |

Underlined values: do not match the targeted values

Mechanical properties of the obtained cold rolled and annealed were determined and gathered in the following table.

The yield strength YS, the tensile strength TS and the total and uniform elongation TE, UE are measured according to ISO standard ISO 6892-1, published in October 2009.

Trials 2 and 4 were not submitted to a second annealing to dilute manganese and carbon in austenite. Therefore, the obtained austenite is too stable after the first annealing, leading to a low elongation.

Trial 9 was submitted to a second annealing temperature T2 which was too high, leading to the formation of a too high fraction of austenite, a part of which transforms into fresh martensite upon cooling, leading to a decrease in yield strength. Moreover, the retained austenite is also not stable enough, leading to a decrease in yield strength and elongation.

Trials 13, 14 and 15 were submitted to a first annealing which temperature was not high enough, leading to the formation of a high density of carbides, which cannot be dissolved easily during the second annealing. The carbon and manganese trapped in carbides cannot contribute to the formation and stabilization of retained austenite. Therefore, the presence of high carbides density leads to the decrease of the global properties combination index (YS×UE+TS×TE)//(C %×Mn %) that is too low.

Trial 16 was not submitted to a first annealing and is not showing enough ferrite in its microstructure. Moreover, it contains 5% of fresh martensite and the retained austenite is not stable enough. These deviations from the invention target lead to a value of global properties combination index which is too low.

TABLE 7

Weldability properties of the cold rolled and annealed steel sheet

| Trials | α (daN/mm$^2$) | LME index |
|---|---|---|
| 1 | 63 | 0.09 |
| 2 | 63 | 0.09 |
| 3 | 63 | 0.09 |
| 4 | 63 | 0.09 |
| 5 | 63 | 0.09 |
| 6 | 63 | 0.09 |
| 7 | 63 | 0.09 |
| 8 | 63 | 0.09 |
| 9 | 63 | 0.09 |
| 10 | 40 | 0.16 |
| 11 | 40 | 0.16 |
| 12 | 40 | 0.16 |
| 13 | 40 | 0.16 |
| 14 | 40 | 0.16 |
| 15 | 40 | 0.16 |
| 16 | 40 | 0.16 |
| 17 | 85 | 0.06 |
| 18 | 85 | 0.06 |
| 19 | 85 | 0.06 |

LME index = % C + % Si/4 in wt %

Spot welding in standard ISO 18278-2 condition was done on the cold rolled and annealed steel sheets.

In the test used, the samples are composed of two sheets of steel in the form of cross welded equivalent. A force is applied so as to break the weld point. This force, known as cross tensile Strength (CTS), is expressed in daN. It depends on the diameter of the weld point and the thickness of the metal, that is to say the thickness of the steel and the metallic coating. It makes it possible to calculate the coefficient α which is the ratio of the value of CTS on the product of the diameter of the welded point multiplied by the thickness of the substrate. This coefficient is expressed in daN/mm$^2$.

Weldability properties of the obtained cold rolled and annealed were determined and gathered in the following table:

What is claimed is:

1. A cold rolled and annealed steel sheet, made of a steel having a composition comprising, by weight percent:
C: 0.03-0.18%
Mn: 6.0-11.0%
Al: 0.2-3%
Mo: 0.05-0.5%
B: 0.0005-0.005%
S≤0.010%
P≤0.020%
N≤0.008%
and optionally one or more of the following elements, in weight percentage:
Si≤1.20%
Ti≤0.050%
Nb≤0.050%
Cr≤0.5%
V≤0.2%
a remainder of the composition being iron and unavoidable impurities resulting from processing;
the steel sheet having a microstructure comprising, in surface fraction, from 25% to 55% of retained austenite, from 45% to 75% of ferrite, less than 5% of fresh martensite, a carbon $[C]_A$ and manganese $[Mn]_A$ content in austenite, expressed in weight percent, such that the ratio $([C]_A \times [Mn]_A^2)/(C\% \times Mn\%)$ is from 19.0 to 41.0 wt %, C % and Mn % being the nominal values in carbon and manganese in weight %, a carbides density below $3 \times 10^6/mm^2$ and an inhomogeneous repartition of manganese defined by a manganese distribution with a slope above or equal to −30.

2. The cold rolled and annealed steel sheet as recited in claim 1, wherein the carbon content is from 0.05% to 0.15%.

3. The cold rolled and annealed steel sheet as recited in claim 1, wherein the manganese content is from 6.0% to 9%.

4. The cold rolled and annealed steel sheet as recited in claim 1, wherein the aluminium content is from 0.7% to 2.2%.

5. The cold rolled and annealed steel sheet as recited in claim 1, wherein the tensile strength is above or equal to 950 MPa, the uniform elongation UE is above or equal to 12.0%, the total elongation TE is above or equal to 15% and wherein YS, UE, TS and TE satisfy the following equation (YS×UE+TS×TE)/(C %×Mn %)>34 000, C % and Mn % being the nominal values in carbon and manganese in weight %.

6. The cold rolled and annealed steel sheet as recited in claim 1, wherein the yield strength is above or equal to 780 MPa.

7. The cold rolled and annealed steel sheet as recited in claim 1, wherein the LME index is below 0.36.

8. The cold rolled and annealed steel sheet as recited in claim 1, wherein the steel has a carbon equivalent Ceq lower than 0.4, the carbon equivalent being defined as $$Ceq=C\%+Si\%/55+Cr\%/20+Mn\%/19-Al\%/18+2.2P\%-3.24B\%-0.133\times Mn\%\times Mo\%$$

with elements being expressed by weight percent.

9. A resistance spot weld of two steel parts made of the cold rolled and annealed steel sheet as recited in claim 1, the resistance spot weld having an α value of at least 30 daN/mm².

* * * * *